(12) United States Patent
O'Brien

(10) Patent No.: US 11,941,443 B2
(45) Date of Patent: Mar. 26, 2024

(54) DISTRIBUTED STORAGE WORKLOAD MANAGEMENT

(71) Applicant: EMC IP Holding Company LLC, Hopkinton, MA (US)

(72) Inventor: Garvin O'Brien, Mitchelstown (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 261 days.

(21) Appl. No.: 17/238,115

(22) Filed: Apr. 22, 2021

(65) Prior Publication Data

US 2022/0342709 A1 Oct. 27, 2022

(51) Int. Cl.
*G06F 9/50* (2006.01)
*G06F 11/30* (2006.01)
*G06F 11/34* (2006.01)

(52) U.S. Cl.
CPC ............ *G06F 9/5016* (2013.01); *G06F 9/505* (2013.01); *G06F 11/3034* (2013.01); *G06F 11/3433* (2013.01)

(58) Field of Classification Search
CPC .... G06F 9/5016; G06F 9/505; G06F 11/3034; G06F 11/3433; G06F 11/1451; G06F 11/1666; G06F 11/2015
See application file for complete search history.

(56) References Cited

U.S. PATENT DOCUMENTS

| | | | |
|---|---|---|---|
| 10,877,786 B1* | 12/2020 | Dunagan | H04L 43/065 |
| 2005/0267950 A1* | 12/2005 | Kitamura | G06F 3/0647 709/219 |
| 2013/0106881 A1* | 5/2013 | Hendry | G06T 1/20 345/522 |
| 2013/0166724 A1* | 6/2013 | Bairavasundaram | H04L 41/0823 709/224 |
| 2014/0122850 A1* | 5/2014 | Duron | G06F 1/24 713/1 |
| 2018/0136981 A1* | 5/2018 | Clayton | G06F 9/5083 |
| 2020/0228486 A1* | 7/2020 | Park | H04L 61/4511 |

* cited by examiner

*Primary Examiner* — Jorge A Chu Joy-Davila
(74) *Attorney, Agent, or Firm* — Muirhead and Saturnelli, LLC

(57) ABSTRACT

Workloads, e.g., synthetic workloads, on one or more storage systems in an dynamic, automated manner, for example, to load test the one or more storage systems. A distributed system may be employed in which a workload information server (WIS) serves one or more clients referred to herein as workload control components (WCCs) that analyze workload information of the one or more storage systems, and control the modification of workloads thereon based on this analysis, through the WIS. The WIS also may serve one or more clients referred to herein as workload generation controllers (WGCs) that monitor workloads on the one or more storage systems, report workload information to the WIS and generate, modify or remove workloads on the one or more storage systems according to instructions received from the WIS in response to requests (e.g., hints) from the one or more WGCs.

17 Claims, 5 Drawing Sheets

DISTRIBUTED STORAGE WORKLOAD MANAGEMENT

BACKGROUND

Technical Field

This application generally relates to data storage networks, and more particularly to managing workloads on one or more storage systems on a data storage network.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, method is performed including: one or more workload generation tools reporting workload information corresponding to one or more workloads executing on the storage system; determining from the workload information a resource utilization value indicative of an amount of resources of the first storage system utilized by the one or more workloads executing on the storage system; comparing the determined utilization value to a predefined target utilization value; determining, based at least in part on the comparison, whether to modify a cumulative workload on the storage system; and, if it is determined to modify the cumulative workload, sending an instruction to at least one of the one or more workload generation tools to initiate a modification of the cumulative workload on the storage system. The workload information may include performance information corresponding to the one or more workloads, and the method further may include selecting the target utilization value based at least in part on the performance information. The workload information may include, for at least a first workload of the one or more workloads, a first resource utilization value indicative of a first amount of resources of the first storage system utilized by the first workload, and the method further may include comparing the first utilization value to a predefined first utilization threshold of the first workload, and determining whether to modify the cumulative workload on the storage system may be based at least in part on the comparison of the first utilization value to the predefined first utilization threshold. The method further may include determining whether there are any controlled workloads currently executing on the storage system, and determining whether to modify the cumulative workload on the storage system may be based at least in part on the comparison of the first utilization value to the predefined first utilization threshold. The instruction to at least one of the one or more workload generation tools may indicate to add and/or remove one or more workloads to the storage system. The instruction to at least one of the one or more workload generation tools may indicate to increase and/or decrease an amount of I/O activity of one or more controlled workloads of the one or more workloads. The method further may include the one or more workload generation tools sending one or more requests for workload tasks, and the instruction to the at least one of the one or more workload generation tools may be sent in response to at least one of the one or more queries. The one or more workload generation tools may report the workload information to a first component, and the method further may include: a second component sending a request for workload information to the first component; and the first component sending at least a portion of the workload information to the second component in response to the request, and the second component may perform the comparing and the determining, and the method further may include the second component sending a request to the first component to instruct the at least one workload generation tool to initiate the modification of the cumulative workload on the storage system, and the first component may send the instruction in response to the request.

In another embodiment of the invention, a system includes: one or more workload generation tools that report workload information corresponding to one or more workloads executing on the storage system; and executable logic that implements a method. The method includes: determining from the workload information a resource utilization value indicative of an amount of resources of the first storage system utilized by the one or more workloads executing on the storage system; comparing the determined utilization value to a predefined target utilization value; determining, based at least in part on the comparison, whether to modify a cumulative workload on the storage system; and, if it is determined to modify the cumulative workload, sending an instruction to at least one of the one or more workload generation tools to initiate a modification of the cumulative workload on the storage system. The workload information may include performance information corresponding to the one or more workloads, and the method further may include selecting the target utilization value based at least in part on the performance information. The workload information may include, for at least a first workload of the one or more workloads, a first resource utilization value indicative of a first amount of resources of the first storage system utilized by the first workload, and the method further may include comparing the first utilization value to a predefined first utilization threshold of the first workload, and determining whether to modify the cumulative workload on the storage system may be based at least in part on the comparison of the first utilization value to the predefined first utilization threshold. The method further may include determining whether there are any controlled workloads currently executing on the storage system, and determining whether to modify the cumulative workload on the storage system may be based at least in part on the comparison of the first utilization value to the predefined first utilization threshold. The instruction to at least one of the one or more workload generation tools may indicate to add and/or remove one or more workloads to the storage system. The instruction to at least one of the one or more workload generation tools may indicate to increase and/or decrease an amount of I/O activity of one or more controlled workloads of the one or more workloads.

In another embodiment of the invention, a computer-readable media has software stored thereon including: executable code that controls one or more workload generation tools to report workload information corresponding to one or more workloads executing on the storage system; executable code that controls determining from the workload information a resource utilization value indicative of an amount of resources of the first storage system utilized by the one or more workloads executing on the storage system; executable code that controls comparing the determined utilization value to a predefined target utilization value; executable code that controls determining, based at least in part on the comparison, whether to modify a cumulative workload on the storage system; and executable code that controls, if it is determined to modify the cumulative workload, sending an instruction to at least one of the one or more workload generation tools to initiate a modification of the cumulative workload on the storage system. The workload information may include performance information corresponding to the one or more workloads, and the software further may include executable code that controls selecting the target utilization value based at least in part on the performance information. The workload information may include, for at least a first workload of the one or more workloads, a first resource utilization value indicative of a first amount of resources of the first storage system utilized by the first workload, and the software further may include executable code that controls comparing the first utilization value to a predefined first utilization threshold of the first workload, and determining whether to modify the cumulative workload on the storage system may be based at least in part on the comparison of the first utilization value to the predefined first utilization threshold. The software further may include executable code that controls determining whether there are any controlled workloads currently executing on the storage system, and determining whether to modify the cumulative workload on the storage system may be based at least in part on the comparison of the first utilization value to the predefined first utilization threshold. The software further may include executable code that controls the one or more workload generation tools sending one or more requests for workload tasks, and the instruction to the at least one of the one or more workload generation tools may be sent in response to at least one of the one or more queries. The one or more workload generation tools report the workload information to a first component, and the software further may include: executable code that controls a second component sending a request for workload information to the first component; and executable code that controls the first component sending at least a portion of the workload information to the second component in response to the request, and the second component performs the comparing and the determining, and the software further may include executable code that controls the second component sending a request to the first component to instruct the at least one workload generation tool to initiate the modification of the cumulative workload on the storage system, and the first component sends the instruction in response to the request.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

It may be desirable to generate synthetic I/O workloads (workloads) on a storage system to test, verify and quantify functionality of a storage system, in particular in a high-load scenario when there is a high amount of resource utilization on the storage system as a result of the workloads. The execution of workloads on a storage system results in the utilization of resources on the storage system. The amount of resources utilized on a storage system as a result of the execution of one or more workloads may be referred to herein as the "load," and the testing of the performance of a storage system, or a portion thereof in response to the load imposed on the system by one or more workloads may be referred to herein as "load testing."

Such load testing of a storage system may involve significant manual effort. For example, an administrator may configure parameters of one or more workload generation tools to generate workloads to be executed on the storage system to test it. Resource utilization and performance information resulting from execution of the workloads may be analyzed, and the parameters of the workload generation tools manually reconfigured based on the analysis. The foregoing process may be performed iteratively. In addition, it may be difficult to sustain targeted resource utilization levels during load testing, requiring further configuration to increase or decrease workload I/O activity to adjust load levels.

It may be desirable to manage synthetic workloads on one or more storage systems without the potential for the foregoing drawbacks.

Described herein are techniques and mechanisms managing workloads, e.g., synthetic workloads, on one or more storage systems in an dynamic, automated manner, for example, to load test the one or more storage systems. In some embodiments, a distributed management system may be employed in which a workload information server (WIS) serves one or more clients referred to herein as workload control components (WCCs) that analyze workload information of the one or more storage systems, and control the modification of workloads thereon based on this analysis, through the WIS. The WIS also may serve one or more clients referred to herein as workload generation controllers (WGCs) that monitor workloads on the one or more storage systems, report workload information to the WIS and generate, modify or remove workloads on the one or more storage systems according to instructions received from the WIS in response to requests (e.g., hints) from the one or more WGCs.

Illustrative embodiments of the invention will now be described in more detail in relation to the figures.

Figure 1:
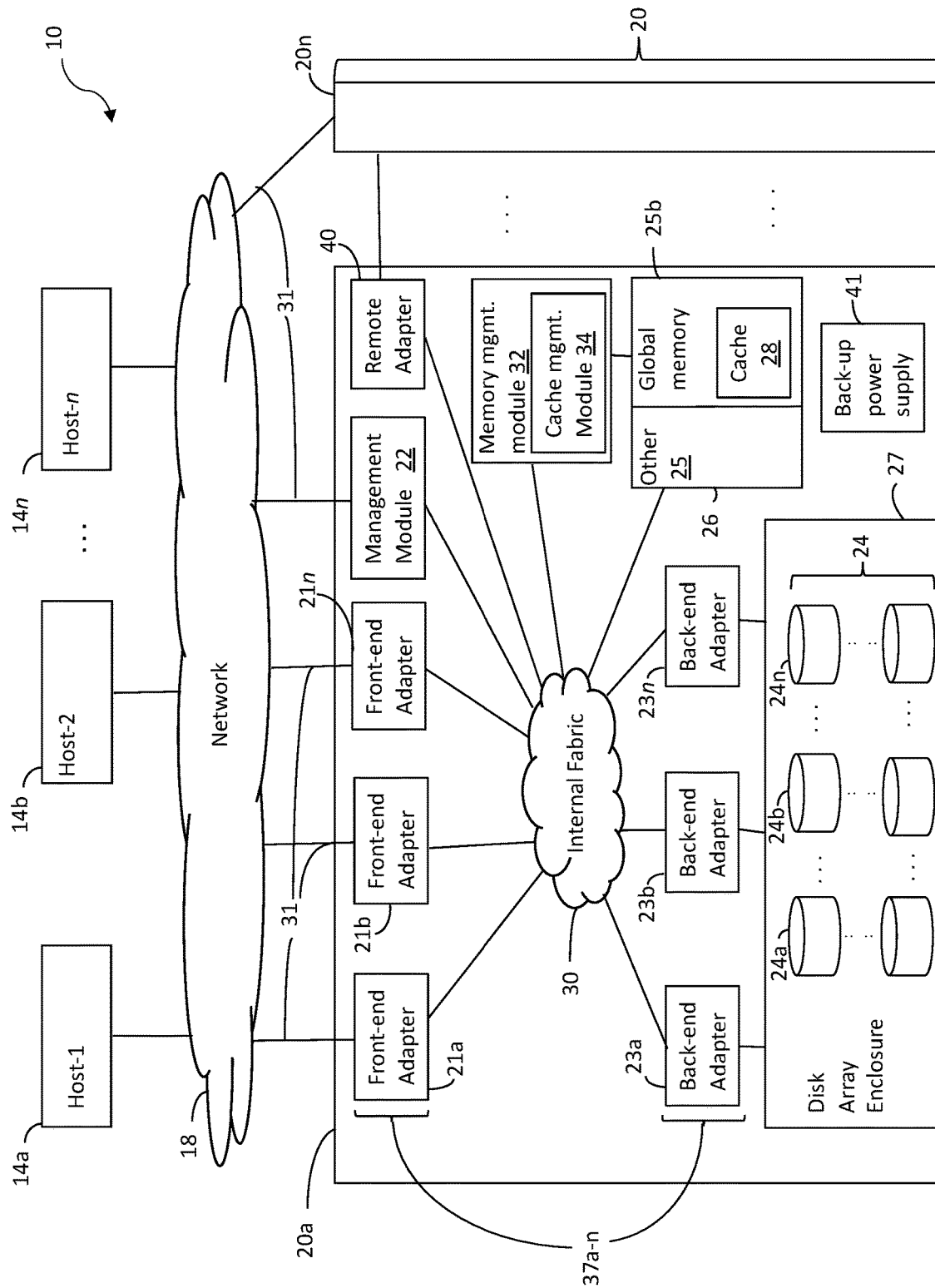
FIG. 1 is a block diagram illustrating an example of a data storage network, according to embodiments of the invention.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof— e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case memory mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
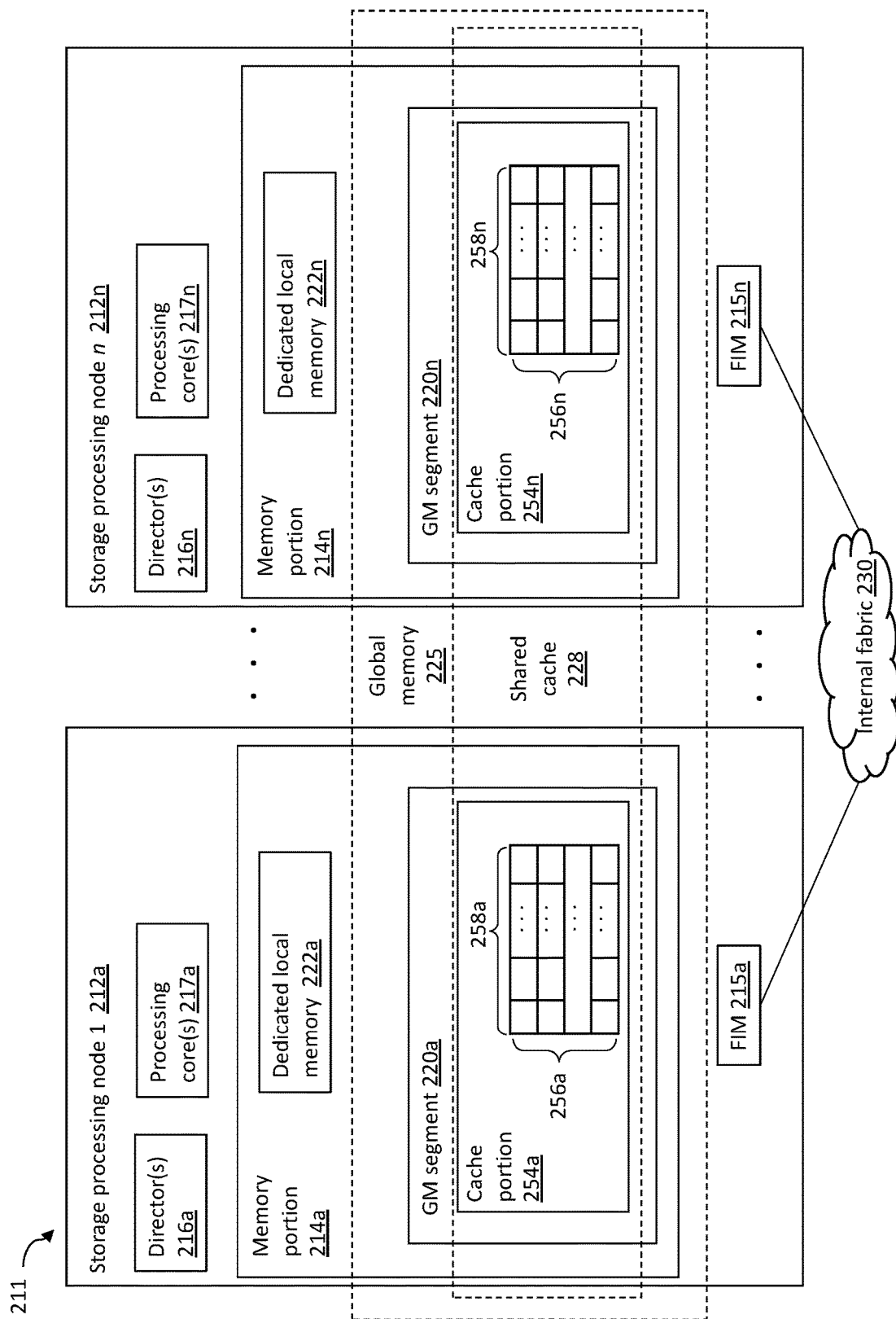
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

In some embodiments, workloads (e.g., synthetic workloads) on a storage network, for example, on one or more storage systems, may be managed, e.g., to load test the one or more storage systems, as will now be described.

Figure 3:
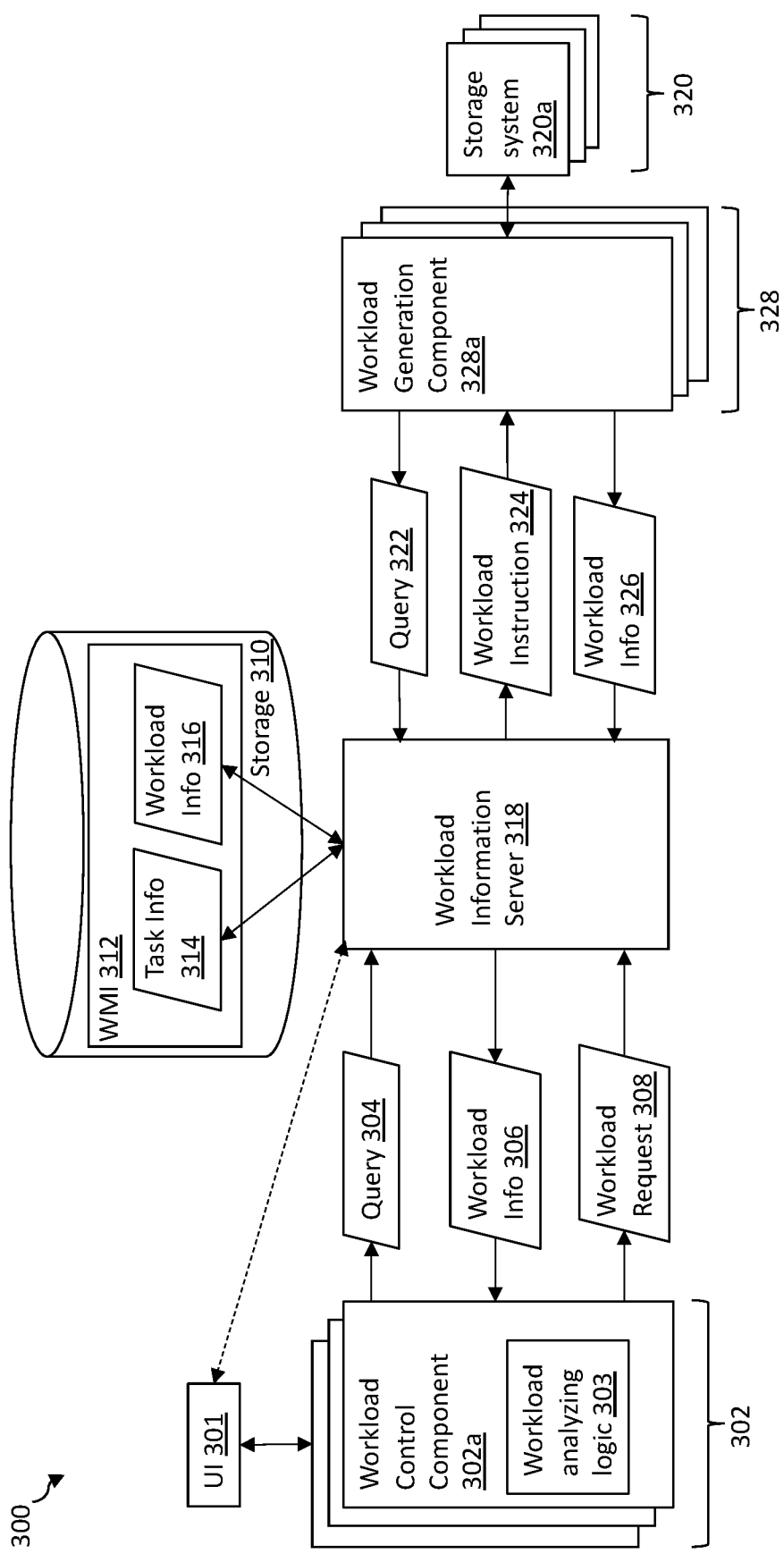
FIG. 3 is a data flow diagram illustrating an example of a system for managing workloads on one or more storage systems, according to embodiments of the invention.

FIG. 3 is a data flow diagram illustrating an example of a system 300 for managing workloads on one or more storage systems, according to embodiments of the invention. Other embodiments of a system for managing workloads on one or more storage systems, for example, variations of the system 300, are possible and are intended to fall within the scope of the invention. The system 300 may be implemented on one or more components of the storage network 10.

The system 300 may include any of: a WIS 318; one or more WCCs 302; one or more WGCs 328; one or more storage systems 320; data storage 310; a user interface 301; other components; or any suitable combination of the foregoing. The WIS 318 may reside on a discrete physical component that is physically separate from one or more discrete physical components on which the one or more WCCs 302 and one or more WGCs 328 reside. For example, the WIS 318 may be remotely connected to the one or more WCCs 302 and one or WGCs 328 by one or more network media, for example, as part of a storage network. In some embodiments, at least one of the WCCs 302 and/or at least one of the WGCs 328 may reside on a same physical component as the WIS 318, and in some cases may be logically and/or physically integrated (e.g., on same board and/or chip) as the WIS 318. The data storage 310 may reside on a same or different physical component than the WIS 318, for example, on a same device or remotely connected by one or more network media. One or more of the components of the system 300 may be implemented as part of one or more host systems (not shown), for example, one of hosts 14a-n, and/or as part of one of the storage systems 320 (e.g., 20a), e.g., as part of management module (e.g., 22) of one of the storage systems 320.

Embodiments of the invention described in relation to the system 300 and elsewhere herein are described in relation to a single storage system (e.g., 320a), single WCC (e.g., 302a) and/or single WGC (e.g., 328a), but the invention is not so limited. It should be appreciated that the techniques and mechanisms described herein may apply to embodiments including multiple storage systems, WCCs and/or WGCs.

The storage system 320a may have a plurality of workloads executing (i.e., running) thereon, including synthetic workloads. Some of the these workloads may be "controlled workloads" that may be controlled as part of the one or more processes implementing the managing of workloads according to embodiments of the invention, whereas others of these workloads may be "independent workloads" that are independent of such processes. Controlled workloads may be generated, adjusted and/or removed according to embodiments of the invention, whereas independent workloads are not capable of being generated, adjusted and/or removed according to embodiments of the invention. For example, independent workloads may be under control of, and/or executed on behalf of, a different entity (e.g., company, department, process, etc.) than an entity controlling the controlled workloads.

The one or more WGCs 328 may generate, monitor, adjust and/or remove workloads running on the storage system 320a, for example, using known techniques. The WGC 328a may send queries 322 to the WIS 318 to request workload tasks, in response to which the WIS 318 may send one or more workload instructions 324 to the WGC 328a. Each workload instruction 324 may result from a workload request 308 sent to the WIS 318 by one of the WCCs 302, for example, WCC 302a, as described in more detail elsewhere herein. Each workload instruction may specify one or more tasks (e.g., actions) to be taken by the WGC 328 in connection with the generation (e.g. adding) of a workload, modification of a workload, removing of a workload. For example, generating a workload may include an initial task of provisioning adequate storage on the storage system 320a to accommodate the workload followed by a task of actually generating the workload, and each of these tasks may include one or more sub-tasks involving one or more communications being exchanged between the WIS 318 and the WGC 328a.

Each of the WGCs 328 may be configured to interface with, or may be part of, a proprietary or commercially available industry-standard workload generation tool, and may provide application programming interfaces (APIs) that enable the WIS 318 to be configured to interact with the WGC. That is, a WGC may be a component that is separate from a workload generation tool, that provide interfaces (e.g., via APIs) to the one or more workload generation tools for the WIS 318, and a WGC also may be part of a workload generation tool, for example, as an add-on or integrated therewith. The WIS 318 also may provide APIs that enable the one or more WGCs 328 to interact with the WIS 318.

The WGC 328a may communicate workload information 326 to the WIS 318. For example, the WGC 328a may be configured to monitor resource utilization and performance of workloads running on the storage system 320a, which may include controlled workloads and independent workloads. The WGC 328a may be configured to perform such monitoring by querying the storage system for key performance indicators (KPIs), for example, in accordance with APIs (e.g., REST—Representational State Transfer—APIs) provided by the storage system 320a. For example, the resource utilization and performance information resulting from such queries may be average values (e.g., time-weighted averages) of utilization and performance parameters (including any of a variety of known utilization and performance parameters) over time. The workload information 326 communicated to the WIS by the WGC 328a may be derived from the raw information the WGC 328a receives from the storage system 320a in response to its queries or may be the raw information itself packaged in accordance with WPI APIs.

The WIS 318 may be configured to store workload management information 312 in the storage 310, including task information 314 and workload information 316. The workload information 316 may include the same workload information 326 received from the one or more WGCs 328 and/or workload information derived therefrom. The task information 314 may include information relating to one or more tasks previously or currently executing on the one or more WGCs 328, and may include information corresponding to one or more tasks currently or previously associated with the one or more WCCs 302.

The WCC 302a may send one or more queries 304 to the WIS 318 requesting workload information—i.e., resource utilization information and performance information—for the storage system 320a. In response to the one or more queries 304, the WIS 318 may retrieve at least a portion of the workload information 316, and send workload information 308 to the WCC 302a. The workload information 306 may include the same information retrieved from the workload information 316 and/or workload information derived therefrom.

The WCC 302a may include workload analyzing logic 303 to analyze the workload information 306 to determine whether one or more workloads should be generated for (added to) the storage system 320a, modified, and/or removed from the storage system 320a. Based on this analysis, the WCC 302a may send one or more workload requests (e.g., hints) to the WIS 318 to generate one or more workloads for the storage system 320a, modify one or more workloads running on the storage system 320a, and/or remove one or more workloads from the storage system 320a, as described in more detail elsewhere herein. In some embodiments, each of the one or more requests 308 may specify a specific one of the one or more WGCs 328 to perform the requested action(s). That is, the WGC 302a may assign the one or more WGCs 328 to perform the tasks associated with requested actions.

In response to the one or more workload requests 308, the WIS 318 may store task information associated with the one or more requests as part of the task information 314, for example, information reflecting the one or more workload requests. The WIS 318 may be configured to respond to the one or more queries 322 received from the one or more WGCs 328 based on the information from the one or more workload requests 308 stored as part of the task information 314. The WIS 318 may be configured to assign a specific one of the WGCs 328 based on information provided in the one or more workload requests 308 and stored as part of the task information 314 and/or to assign a specific one of the WGCs 328 based on other factors.

The WIS 318 may be configured to interact with a plurality of WCCs 302 as described above, and may organize the task information 314 and/or workload information 316 based on WCC and/or based on WGC. By having a distributed system 300, in which a centralized WIS 318 may serve multiple WCCs 302 and/or WGCs, the system 300 may be scaled to accommodate additional WCCs and/or WGCs without the need to recode or modify hardware of the WIS 318 in order to operate properly.

The user interface 301 may be used by user to configure one or more components of the system 300, including, but not limited to, the one or more WCCs 302, the WIS 318 and the one or more WGCs 328, for example, over one or more network media. Further, task and workload information, including any of the task and workload information described herein, may be presented to the user via the user interface, for example on a monitor or display screen of a device.

Figure 4:
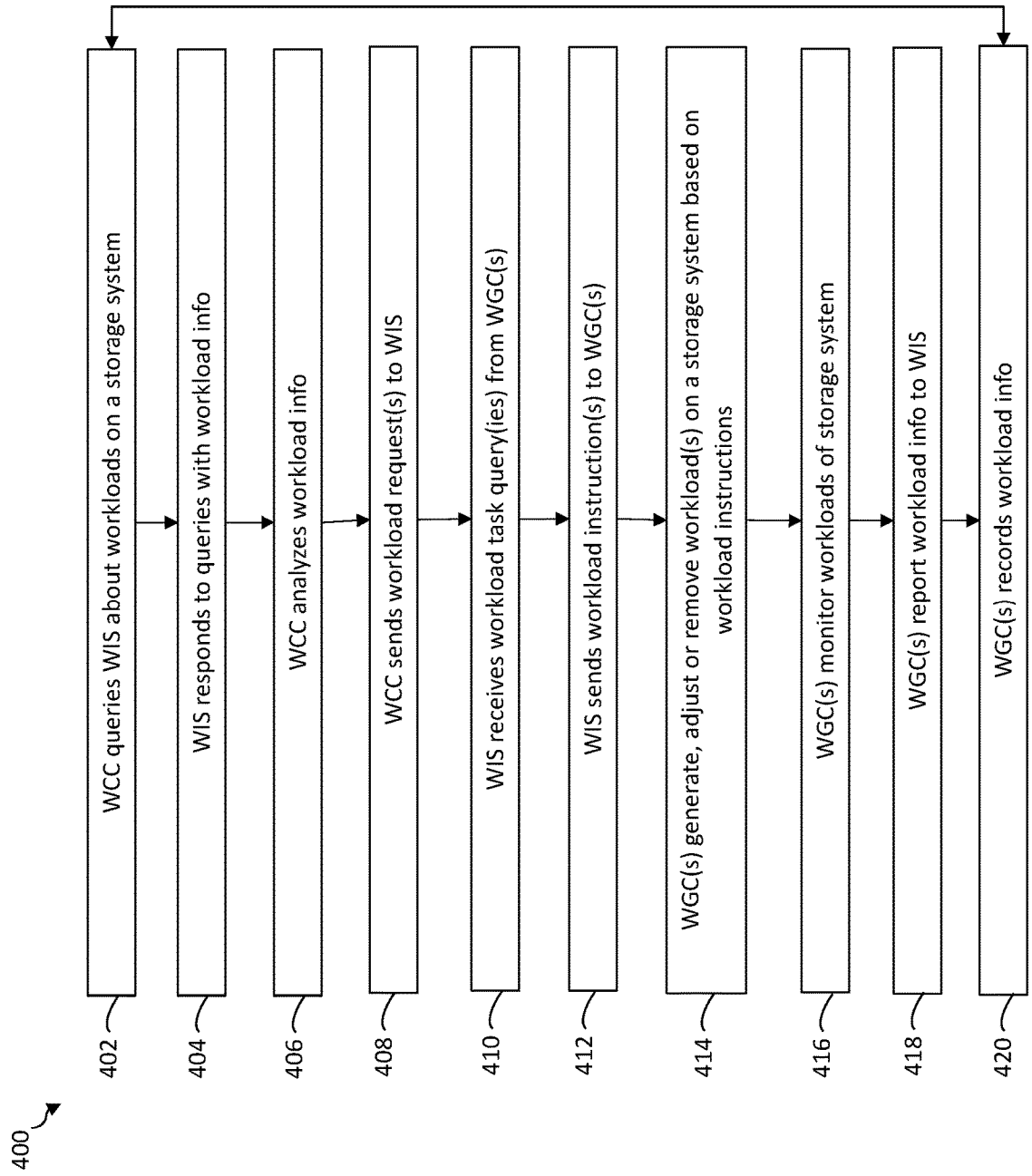
FIG. 4 is a flowchart illustrating an example of a method of managing workloads on one or more storage systems, according to embodiments of the invention.

FIG. 4 is a flowchart illustrating an example of a method 400 of managing workloads on one or more storage systems, according to embodiments of the invention. Other embodiments of a method of managing workloads on one or more storage systems, for example, variations of the method 400, are possible and are intended to fall within the scope of the invention. The method 400 may be implemented on one or more components of the system 300.

In a step 404, a WCC (e.g., the WCC 302a) may query a WIS (e.g., the WIS 318) about workloads on a storage system (e.g., the storage system 320a), in response to which the WIS may respond to the query with workload information, for example, as described in more detail elsewhere herein. In a step 406, the WCC may analyze the workload information, and determine whether to generate, modify and/or remove one or more workloads based on the analysis, for example, as described in relation to a method 500 described in connection with the FIG. 5.

Figure 5:
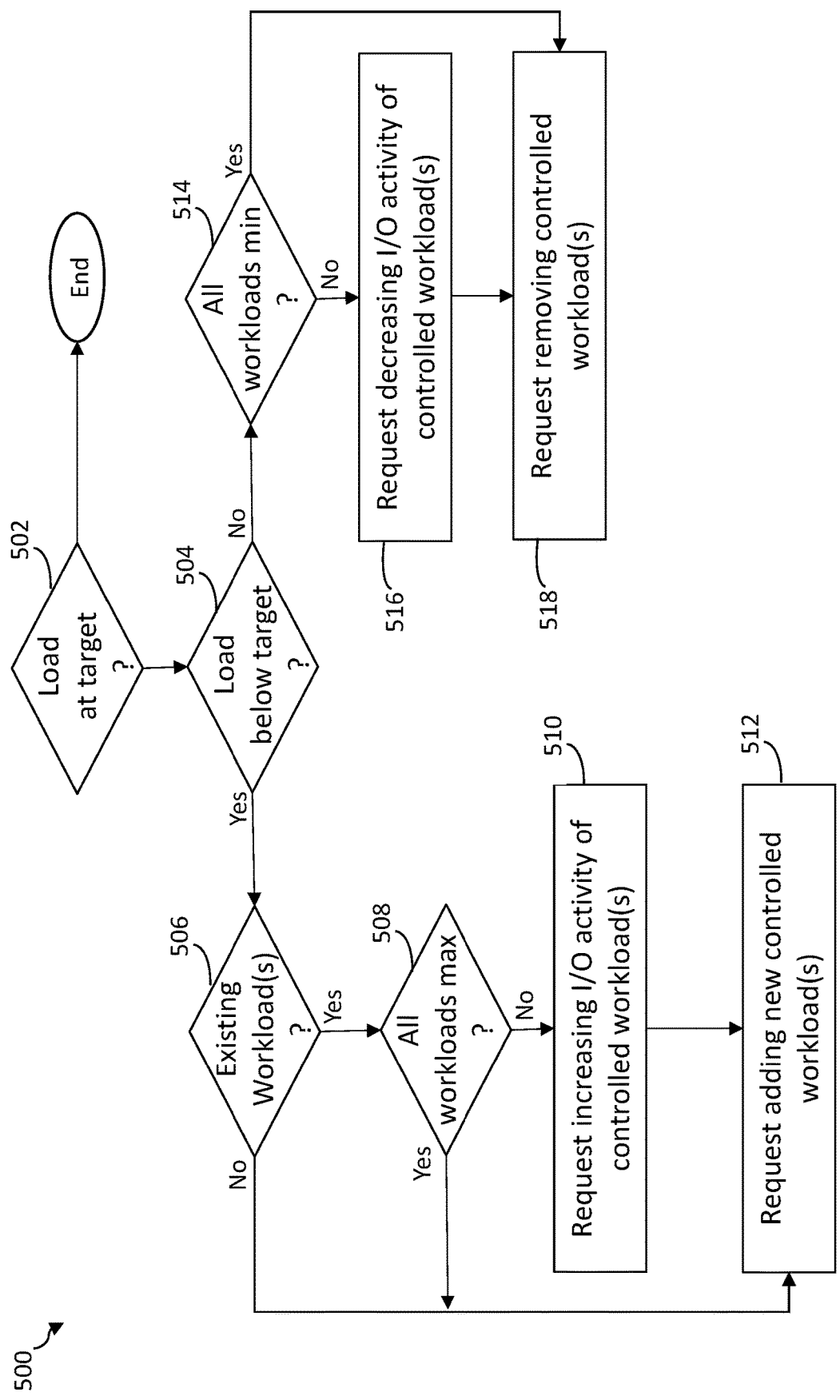
FIG. 5 is a flowchart illustrating an example of a method of determining whether and how to add, adjust or remove workloads on one or more storage systems, according to embodiments of the invention.

FIG. 5 is a flowchart illustrating an example of the method 500 of determining whether and how to add, adjust or remove workloads on one or more storage systems, according to embodiments of the invention. Other embodiments of a method of determining whether and how to add, adjust or remove workloads on one or more storage systems, for example, variations of the method 500, are possible and are intended to fall within the scope of the invention.

In a step 502, it may be determined whether the cumulative resource utilization of the workloads on the storage system (i.e., the overall load) is the same as a predefined target load of the storage system, e.g., for load-testing purposes. That is, the resource utilization information included in the workload information received from the WIS may be analyzed to determine if the load target has been achieved. In some embodiments, additional information, e.g., performance information, in the received workload information may be analyzed to determine if a load target has been achieved. For example, the WCC may be configured with different load targets based on performance of the storage system, and a load target—i.e., a cumulative resource utilization target—may be determined (e.g., selected) based at least in part on the performance of the storage system as indicated by one or more pieces of performance information included in the received workload information.

If it is determined in the step 502 that the load target has been met (e.g., but not exceeded), then there may be no need to add, modify or remove a workload from the storage system, and the method 500 may end. Otherwise, in a step 504, it may be determined whether the determined (e.g., reported) load of the storage system is below a target load, e.g., a target load selected based at least in part on performance information. If the determined load of the storage system is below the target load, in a step 506 it may be determined whether are any controlled workloads on the storage system.

If it is determined in the step 506 that there one or more controlled loads on the storage system, then, in a step 508, it may be determined whether any of the workloads are not producing maximum resource utilization—i.e., whether all of the controlled workloads are at maximum resource utilization. For example, for each controlled workload generated on the storage system, a maximum resource utilization (load) threshold may be defined for the controlled workload. For example, the maximum load threshold for a controlled workload may be determined by a WGC and communicated to the WIS, which may store and communicate the maximum load threshold for the controlled workload to one or more WCCs. Alternatively or additionally, the maximum load threshold for a controlled workload may be defined by a user, for example, using the user interface 301. Further, the workload information 326, 316 and 306 may include workload information for a specific controlled workload, including the resource utilization (load) of the controlled workload. Thus, the workload information received by the WCC may include the specific load of each controlled workload, and the step 508 may include determining, for each controlled workload, whether the load of each controlled workload has reached a maximum load threshold for the controlled workload, i.e., by comparing the load value to the maximum load value.

If it is determined in the step 508 that all controlled workloads have reached their maximum load target, or if it is determined in the step 506 that there are no current controlled workloads, then the WCC may request adding (i.e., generating) one or more new controlled workloads in a step 512 to increase the cumulative resource utilization of the workloads on the storage system. For example, one or more workload requests sent from the WCC to the WIS may include an indication for one or more (e.g., specified) WGCs to generate one or more workloads on the storage system.

If it is determined in the step 508 that one or more controlled workloads have not reached their maximum load target, then the WCC may request increasing the I/O activity of at least one of the one or more controlled workloads in a step 510 to increase the cumulative resource utilization of the workloads on the storage system. For example, one or more workload requests sent from the WCC to the WIS may include an indication for one or more (e.g., specified) WGCs to increase the I/O activity of the at least one workload on the storage system. From the step 510, control can proceed to the step 512.

Returning to the step 504, if it is determined that the determined load of the storage system is above the target load, in a step 514 it may be determined whether any of the workloads are not producing a minimum resource utilization—i.e., whether all of the controlled workloads are at minimum resource utilization. For example, for each controlled workload generated on the storage system, a minimum resource utilization (load) threshold may be defined for the controlled workload. For example, the minimum load threshold for a controlled workload may be determined by a WGC and/or user, and may be communicated to the WIS, which may store and communicate the minimum load threshold for the controlled workload to one or more WCCs. Thus, the step 514 may include determining, for each controlled workload, whether the load of each controlled workload is at a minimum load threshold for the controlled workload, i.e., by comparing the load value to the minimum load value If it is determined in the step 514 that all controlled workloads have reached their minimum load target, then the WCC may request removing one or more controlled workloads from the storage system in a step 518 to decrease the cumulative resource utilization of the workloads on the storage system. For example, one or more workload requests sent from the WCC to the WIS may include an indication for one or more (e.g., specified) WGCs to remove one or more workloads on the storage system.

If it is determined in the step 514 that one or more controlled workloads have not reached their minimum load target, then the WCC may request decreasing the I/O activity of at least one of the one or more controlled workloads in a step 516 to decrease the cumulative resource utilization of the workloads on the storage system. For example, one or more workload requests sent from the WCC to the WIS may include an indication for one or more (e.g., specified) WGCs to decrease the I/O activity of the at least one workload on the storage system. From the step 516, control can proceed to the step 518.

Returning to the method 400, the WCC may send one or more workload requests (e.g., the workload requests 308) in a step 408, which may specific whether to generate, modify and/or remove one or more workloads based on the analysis performed in the step 406 (e.g., the method 500), for example, as described in more detail elsewhere herein. The WIS may store task information based on the one or more workload requests (not shown), for example, as described in more detail elsewhere herein.

In a step 410, the WIS may receive one or more workload task queries (e.g., 322) from one or more WGCs (e.g., 328), and send one or more workload instructions (e.g., 324) to one or more WGCs in response to workload task queries in a step 412, for example, as described in more detail elsewhere herein.

In a step 414, the one or more WGCs may generate, adjust (i.e., modify) and/or remove one or more workload(s) on one or more storage systems (e.g., 320), for example, as described in more detail elsewhere herein. The one or more WGCs may monitor workloads (including controlled and independent workloads) in a step 416, and report workload information (e.g., 326), including utilization and performance information to the WIS in a step 418, as described in more detail elsewhere herein. The WIS may record workload information (e.g., 316) in a step 420, which may include at least a portion of the workload information reported from the one or more WGCs and/or information derived therefrom, as described in more detail elsewhere herein.

It should be appreciated that, while the steps of the method 400 are illustrated in FIG. 4 as being performed serially in a certain order, the invention is not so limited. One or more of the steps or portions thereof may be performed concurrently with other steps or portions thereof, or in orders other than those illustrated in FIG. 4, and may be performed in response to events (e.g., user input, interrupts, reception of data from another component, etc.) that do not occur at a set point in the sequence illustrated in FIG. 4. For example, the collective steps 416-420 may be performed before and/or concurrently to the collective steps 410-414 and/or the collective steps 402-408.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 400 and 500, or parts thereof, may be implemented using one or more of the systems and/or data structures described in relation to FIGS. 1-3, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:
1. A method comprising:
one or more workload generation tools reporting workload information corresponding to a plurality of workloads executing on the storage system, wherein the plurality of workloads includes a first controlled workload that is controlled by a set of components including the one or more workload generation tools, and wherein the plurality of workloads includes a first independent workload that is not controlled by the set of components;

determining from the workload information a resource utilization value indicative of an amount of resources of the storage system utilized by the plurality of workloads executing on the storage system;

comparing the determined utilization value to a predefined target utilization value;

determining, based at least in part on the comparison, whether to modify a cumulative workload on the storage system, wherein the cumulative workload includes the plurality of workloads having the corresponding workload information reported by the one or more workload generation tools; and if it is determined to modify the cumulative workload, performing first processing including:
  sending an instruction to at least one of the one or more workload generation tools to initiate a modification of the cumulative workload on the storage system; and
  responsive to receiving the instruction, the at least one workload generation tool performing one or more tasks that modify the cumulative workload on the storage system, including modifying the first controlled workload.

2. The method of claim 1, wherein the workload information includes performance information corresponding to the plurality of workloads, and the method further comprises:
selecting the target utilization value based at least in part on the performance information.

3. The method of claim 1, wherein the workload information includes, for at least the first controlled workload of the plurality of workloads, a first resource utilization value indicative of a first amount of resources of the storage system utilized by the first controlled workload, wherein the method further comprises:
  comparing the first utilization value to a predefined first utilization threshold of the first controlled workload, and
  wherein determining whether to modify the cumulative workload on the storage system is based at least in part on the comparison of the first utilization value to the predefined first utilization threshold.

4. The method of claim 1, wherein the instruction to at least one of the one or more workload generation tools indicates to perform any of: add a new controlled workload to the storage system, and remove a controlled workload from the storage system.

5. The method of claim 1, wherein the instruction to at least one of the one or more workload generation tools indicates to increase and/or decrease an amount of I/O activity of one or more controlled workloads of the plurality of workloads.

6. The method of claim 1, further comprising:
the one or more workload generation tools sending one or more requests or queries for workload tasks, wherein the instruction to the at least one of the one or more workload generation tools is sent in response to at least one of the one or more requests or queries.

7. The method of claim 1, wherein the set of components further includes a first component and a second component, wherein the one or more workload generation tools report the workload information to the first component, wherein the method further comprises:

the second component sending a request for workload information to the first component; and
the first component sending at least a portion of the workload information to the second component in response to the request,
wherein the second component performs the comparing and the determining, wherein the method further comprises:
the second component sending a request to the first component to instruct the at least one workload generation tool to initiate the modification of the cumulative workload on the storage system, and
wherein the first component sends the instruction in response to the request.

8. A system comprising:
one or more workload generation tools reporting workload information corresponding to a plurality of workloads executing on the storage system, wherein the plurality of workloads includes a first controlled workload that is controlled by a set of components including the one or more workload generation tools, and wherein the plurality of workloads includes a first independent workload that is not controlled by the set of components; and
one or more memories comprising code stored therein that, when executed, performs a method including:
determining from the workload information a resource utilization value indicative of an amount of resources of the storage system utilized by the plurality of workloads executing on the storage system;
comparing the determined utilization value to a predefined target utilization value;
determining, based at least in part on the comparison, whether to modify a cumulative workload on the storage system, wherein the cumulative workload includes the plurality of workloads having the corresponding workload information reported by the one or more workload generation tools; and
if it is determined to modify the cumulative workload, performing first processing including:
  sending an instruction to at least one of the one or more workload generation tools to initiate a modification of the cumulative workload on the storage system; and
  responsive to receiving the instruction, the at least one workload generation tool performing one or more tasks that modify the cumulative workload on the storage system, including modifying the first controlled workload.

9. The system of claim 8, wherein the workload information includes performance information corresponding to the plurality of workloads, and wherein the method further comprises:
selecting the target utilization value based at least in part on the performance information.

10. The system of claim 8, wherein the workload information includes, for at least the first controlled workload of the plurality of workloads, a first resource utilization value indicative of a first amount of resources of the storage system utilized by the first controlled workload, wherein the method further comprises:
  comparing the first utilization value to a predefined first utilization threshold of the first controlled workload, and
  wherein determining whether to modify the cumulative workload on the storage system is based at least in part on the comparison of the first utilization value to the predefined first utilization threshold.

11. The system of claim 8, wherein the instruction to at least one of the one or more workload generation tools indicates to perform any of: add a new controlled workload to the storage system, and remove a controlled workload from the storage system.

12. The system of claim 8, wherein the instruction to at least one of the one or more workload generation tools indicates to increase and/or decrease an amount of I/O activity of one or more controlled workloads of the plurality of workloads.

13. One or more non-transitory computer readable media having code stored thereon that, when executed, performs a method comprising:
  one or more workload generation tools reporting workload information corresponding to a plurality of workloads executing on the storage system, wherein the plurality of workloads includes a first controlled workload that is controlled by a set of components including the one or more workload generation tools, and wherein the plurality of workloads includes a first independent workload that is not controlled by the set of components;
  determining from the workload information a resource utilization value indicative of an amount of resources of the storage system utilized by the plurality of workloads executing on the storage system;
  comparing the determined utilization value to a predefined target utilization value;
  determining, based at least in part on the comparison, whether to modify a cumulative workload on the storage system, wherein the cumulative workload includes the plurality of workloads having the corresponding workload information reported by the one or more workload generation tools; and
  if it is determined to modify the cumulative workload, performing first processing including:
    sending an instruction to at least one of the one or more workload generation tools to initiate a modification of the cumulative workload on the storage system; and
    responsive to receiving the instruction, the at least one workload generation tool performing one or more tasks that modify the cumulative workload on the storage system, including modifying the first controlled workload.

14. The one or more non-transitory computer-readable media of claim 13, wherein the workload information includes performance information corresponding to the plurality of workloads, and wherein the method further comprises:
  selecting the target utilization value based at least in part on the performance information.

15. The one or more non-transitory computer-readable media of claim 13, wherein the workload information includes, for at least a first workload of the one or more workloads, a first resource utilization value indicative of a first amount of resources of the first storage system utilized by the first workload, and wherein the method further comprises:
  comparing the first utilization value to a predefined first utilization threshold of the first workload, and
  wherein determining whether to modify the cumulative workload on the storage system is based at least in part on the comparison of the first utilization value to the predefined first utilization threshold.

16. The one or more non-transitory computer-readable media of claim 13, wherein the method further comprises:
  the one or more workload generation tools sending one or more requests or queries for workload tasks, wherein the instruction to the at least one of the one or more workload generation tools is sent in response to at least one of the one or more requests or queries.

17. The one or more non-transitory computer-readable media of claim 13, wherein the set of components includes a first component and a second component, and wherein the one or more workload generation tools report the workload information to the first component, and wherein the method further comprises:
  the second component sending a request for workload information to the first component; and
  the first component sending at least a portion of the workload information to the second component in response to the request,
  wherein the second component performs the comparing and the determining,
  wherein the method further comprises:
  sending a request to the first component to instruct the at least one workload generation tool to initiate the modification of the cumulative workload on the storage system, and wherein the first component sends the instruction in response to the request.

\* \* \* \* \*

UNITED STATES PATENT AND TRADEMARK OFFICE
CERTIFICATE OF CORRECTION

PATENT NO. : 11,941,443 B2
APPLICATION NO. : 17/238115
DATED : March 26, 2024
INVENTOR(S) : O'Brien It is certified that error appears in the above-identified patent and that said Letters Patent is hereby corrected as shown below:

In the Claims

Column 22, Line 12:
In Claim 15, the phrase "resources of the first storage system" should read -- resources of the storage system --

Signed and Sealed this
Thirtieth Day of April, 2024

Katherine Kelly Vidal
Director of the United States Patent and Trademark Office